United States Patent
Xia

(10) Patent No.: US 11,100,312 B2
(45) Date of Patent: Aug. 24, 2021

(54) FACE RECOGNITION METHOD AND MOBILE TERMINAL

(71) Applicant: VIVO MOBILE COMMUNICATION CO., LTD., Guangdong (CN)

(72) Inventor: Liang Xia, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 4 days.

(21) Appl. No.: 16/645,674

(22) PCT Filed: Aug. 15, 2018

(86) PCT No.: PCT/CN2018/100634
§ 371 (c)(1),
(2) Date: Mar. 9, 2020

(87) PCT Pub. No.: WO2019/047694
PCT Pub. Date: Mar. 14, 2019

(65) Prior Publication Data
US 2020/0272809 A1    Aug. 27, 2020

(30) Foreign Application Priority Data

Sep. 7, 2017 (CN) .......................... 201710800895.0

(51) Int. Cl.
*G06K 9/00* (2006.01)
*G06F 16/532* (2019.01)
(Continued)

(52) U.S. Cl.
CPC ....... *G06K 9/00288* (2013.01); *G06F 16/532* (2019.01); *G06F 21/32* (2013.01);
(Continued)

(58) Field of Classification Search
CPC ... G06F 16/532; G06F 21/32; G06K 9/00288; H04M 1/72439; H04M 1/72463;
(Continued)

(56) References Cited

U.S. PATENT DOCUMENTS 8,560,004 B1 * 10/2013 Tsvetkov ................ H04M 1/67
455/550.1
9,467,403 B2 * 10/2016 Chen ........................ H04W 4/12
(Continued)

FOREIGN PATENT DOCUMENTS

| CN | 101754462 A | 6/2010 |
|---|---|---|
| CN | 102111490 A | 6/2011 |

(Continued)

OTHER PUBLICATIONS

European Search Report dated Aug. 20, 2020 issued in PCT/CN2018/100634.
(Continued)

*Primary Examiner* — Manuchehr Rahmjoo
(74) *Attorney, Agent, or Firm* — Gearhart Law LLC; David Postolski, Esq.

(57) ABSTRACT

The present disclosure provides a face recognition method and a mobile terminal. The method includes: detecting whether a mobile terminal switches from a stationary state to a raised state; activating a camera and capturing an image by the camera, when the mobile terminal switches from the stationary state to the raised state; judging whether the image matches a preset face template; and determining that recognition is successful when the image matches the preset face template.

10 Claims, 5 Drawing Sheets

(51) Int. Cl.
*G06F 21/32* (2013.01)
*H04N 5/232* (2006.01)
*H04M 1/72463* (2021.01)

(52) U.S. Cl.
CPC ........ *H04M 1/72463* (2021.01); *H04N 5/232* (2013.01); *H04M 2250/52* (2013.01)

(58) Field of Classification Search
CPC ......... H04M 1/72484; H04M 2250/12; H04M 2250/22; H04M 2250/52; H04N 5/232
See application file for complete search history.

(56) References Cited

U.S. PATENT DOCUMENTS

| | | |
|---|---|---|
| 2009/0262078 A1 | 10/2009 | Pizzi |
| 2011/0151934 A1 | 6/2011 | Geng |
| 2012/0235790 A1 | 9/2012 | Zhao et al. |
| 2015/0362986 A1 | 12/2015 | Lee et al. |
| 2017/0180362 A1 | 6/2017 | Du |

FOREIGN PATENT DOCUMENTS

| | | |
|---|---|---|
| CN | 103227869 A | 7/2013 |
| CN | 103885593 A | 6/2014 |
| CN | 104284004 A | 1/2015 |
| CN | 104539838 A | 4/2015 |
| CN | 104700017 A | 6/2015 |
| CN | 104735337 A | 6/2015 |
| CN | 104869220 A | 8/2015 |
| CN | 104935823 A | 9/2015 |
| CN | 105468950 A | 4/2016 |
| CN | 106713665 A | 5/2017 |
| CN | 107015745 A | 8/2017 |
| CN | 107707738 A | 2/2018 |

OTHER PUBLICATIONS

International Preliminary Report on Patentability dated Mar. 19, 2020, issued in PCT/CN2018/100634.
Office Action dated Apr. 11, 2019, issued in Chinese Application No. 201710800895.0.
Search Report dated Nov. 15, issued in Chinese Application No. 201710800895.0.

* cited by examiner

FACE RECOGNITION METHOD AND MOBILE TERMINAL

CROSS-REFERENCE TO RELATED APPLICATION

This application is the U.S. national phase of PCT Application PCT/CN2018/100634 filed on Aug. 15, 2018, which claims the benefit and priority of Chinese Application No. 201710800895.0, filed on Sep. 7, 2017, which is incorporated herein by reference in its entirety.

TECHNICAL FIELD

The present disclosure relates to the field of communication technologies, and in particular to a face recognition method and a mobile terminal.

BACKGROUND

As is well known, mobile terminals in the related art can implement various applications through the face recognition technology, such as password unlocking and permission control through face recognition. When performing password unlocking, it may unlock a locked screen of the mobile terminal or unlock an application. For example, the mobile terminal in the related art generally has a screen protection function, and the user can actively control the mobile terminal to switch to a locked screen state or the mobile terminal automatically switches to the locked screen state when not used. In the locked screen state, the user may unlock the mobile terminal through various unlocking manners, and the face recognition unlocking is one of the commonly used unlocking manners. For the mobile terminal in the related art, the user needs to wake up the mobile terminal, then activate the camera, and finally adjust orientation of the mobile terminal for face recognition, which is cumbersome in operation, resulting in a long time for face recognition.

SUMMARY

One embodiment of the present disclosure provides a face recognition method applied to a mobile terminal, including:

detecting whether a mobile terminal switches from a stationary state to a raised state;

activating a camera and capturing an image by the camera, when the mobile terminal switches from the stationary state to the raised state;

judging whether the image matches a preset face template; and determining that recognition is successful when the image matches the preset face template.

One embodiment of the present disclosure further provides a mobile terminal including:

a detecting module used to detect whether the mobile terminal switches from a stationary state to a raised state;

an activation module used to, when the mobile terminal switches from the stationary state to the raised state, activate a camera to capture an image by the camera;

a judging module used to judge whether the image matches a preset face template;

a determination module used to determine that recognition is successful when the image matches the preset face template.

One embodiment of the present disclosure further provides a mobile terminal including:

one or more processors;
a memory; and
one or more programs;

wherein the one or more programs are stored in the memory and configured to be executed by the one or more processors, the one or more programs are executed to implement step of the above face recognition method.

One embodiment of the present disclosure further provides a computer readable storage medium including a computer program stored thereon; wherein the computer program is executed by a processor to implement the steps of the above face recognition method.

BRIEF DESCRIPTION OF THE DRAWINGS

To describe technical solutions of embodiments in the application more clear, brief descriptions of the drawings used for depicting embodiments of the application will be put forward in the following. It is obvious that, the drawings described in the following are only some embodiments of the application. For persons having ordinary skill in the art, other drawings may be obtained from these drawings without creative work.

DETAILED DESCRIPTION

The following describes clearly and completely the technical solutions according to the embodiments of this disclosure with reference to the accompanying drawings in the embodiments of this disclosure. It is apparent the embodiments in the following description are merely a part rather than all of the embodiments of this disclosure. All other embodiments obtained by a person of ordinary skill in the art based on the embodiments of this disclosure without creative efforts shall fall within the scope of this disclosure.

Figure 1:
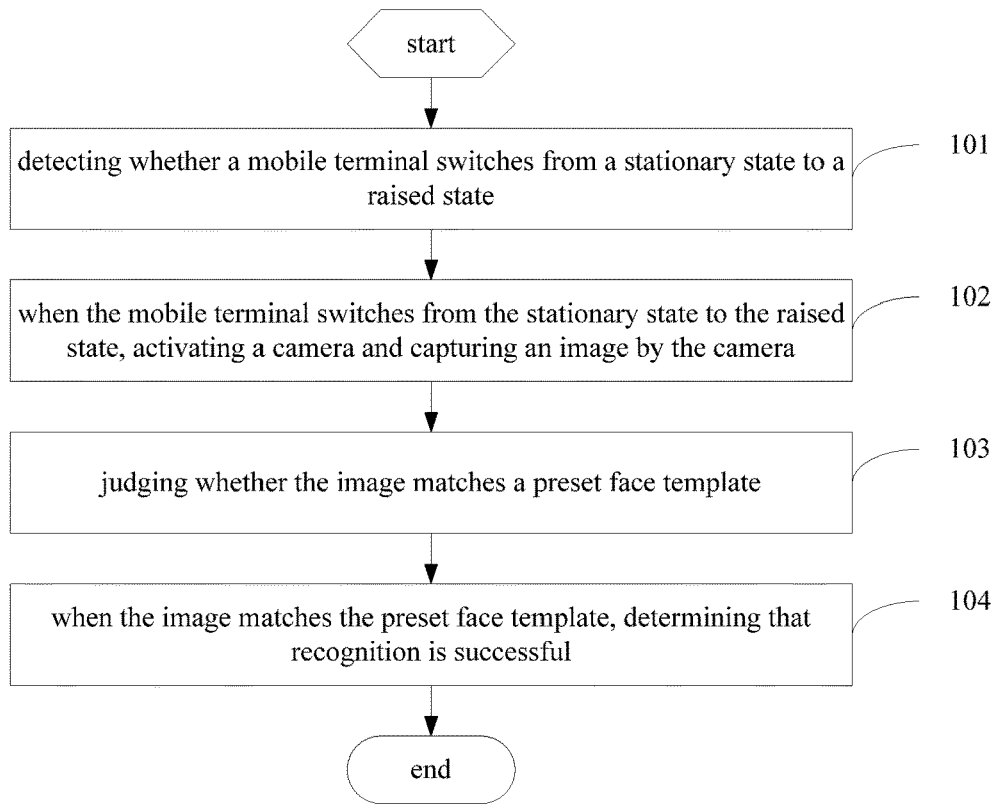
FIG. 1 is a first flowchart of a face recognition method according to an embodiment of the present disclosure.

Referring to FIG. 1, FIG. 1 is a flowchart of a face recognition method according to an embodiment of the present disclosure. As shown in FIG. 1, the method includes the following steps.

Step 101: detecting whether a mobile terminal switches from a stationary state to a raised state.

The face recognition method provided in the embodiment of the present disclosure is mainly applied to a mobile terminal, to enable the mobile terminal to automatically implement face recognition operations and then perform a corresponding operation after the face recognition is matched.

In this step, detecting whether the mobile terminal switches from the stationary state to the raised state in real time. Specifically, a sensor may be provided for detecting the current state of the mobile terminal, thereby determining whether the state of the mobile terminal switches.

Step 102: when the mobile terminal switches from the stationary state to the raised state, activating a camera and capturing an image by the camera.

When the mobile terminal switches from the stationary state to the raised state, it can be determined that the mobile terminal is lifted up. At this time, the camera of the mobile terminal is automatically activated to capture images. In this embodiment, the camera may be a front camera, and of course, may be other cameras, such as a rotatable camera.

Step 103: judging whether the image matches a preset face template.

Step 104: when the image matches the preset face template, determining that recognition is successful.

It should be understood that in an ideal state, there is only one face image in the captured image. Of course, there may be multiple face images. When performing face recognition, each face feature recognized is independent and all face features recognized can't be combined.

In the step, when there is a face in the captured image, the face in the image is subjected to face recognition according to a preset face recognition algorithm to extract face features. Then, the recognized face features are matched with the preset face template. When the matching is successful, the corresponding operation can be performed, for example, unlocking or setting permissions and other operations.

In this way, when the mobile terminal switches from the stationary state to the raised state, the method of the embodiment of the present disclosure activates the camera to capture an image and then performs face recognition, thereby shortening operation time of the face recognition, improving the convenience of the face recognition, and improving intelligence of the mobile terminal.

Figure 2:
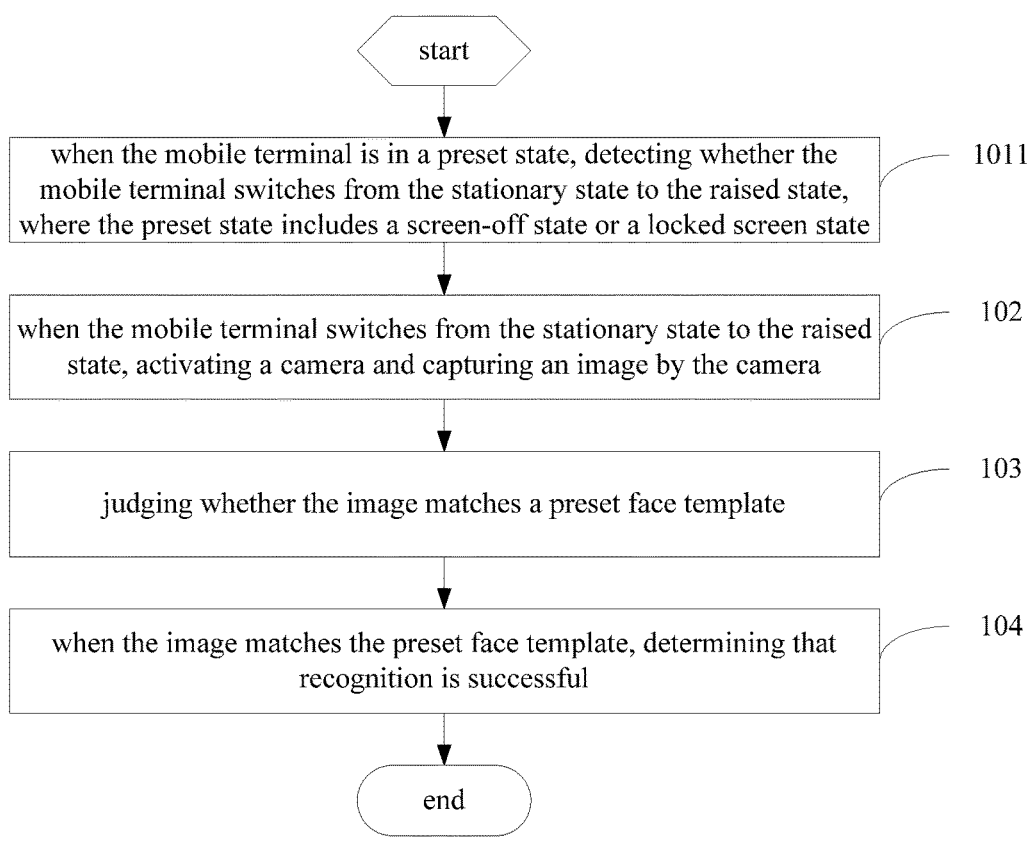
FIG. 2 is a second flowchart of a face recognition method according to an embodiment of the present disclosure.

It should be understood that the face recognition method in the embodiment of the present disclosure may be applied to different scenarios, such as unlocking, encryption and permission setting. The following embodiment will be described in detail in an unlocking application scenario. Specifically, referring to FIG. 2, in the embodiment, the above step 101 includes the following steps.

Step 1011: when the mobile terminal is in a preset state, detecting whether the mobile terminal switches from the stationary state to the raised state, where the preset state includes a screen-off state or a locked screen state.

In this step, the mobile terminal has a locked screen function and is configured with a face recognition unlock mode, that is, the user first sets the face unlock mode. When setting the face unlock mode, the mobile terminal captures the user face, performs face recognition, and extracts preset face features as face features that can unlock the mobile terminal. The user can manually control the mobile terminal to switch to the locked screen state or the screen-off state, or the mobile terminal automatically switches to the locked screen state or the screen-off state after the mobile terminal is not used for a certain period of time. After the mobile terminal switches to the locked screen state or the screen-off state, it can detect in real time whether the mobile terminal switches from the stationary state to the raised state. In this embodiment, when the face recognition is successful, the unlocking will be performed.

It should be noted that in the embodiment of the present disclosure, the camera may capture images in the above preset state, that is, without switching the state of the mobile terminal, directly activating the camera in the background for capturing an image and performing face recognition. When the face recognition is successful, the unlocking operation can be carried out. This will be an unperceived unlocking for the user, thereby improving the user experience and reducing the time for face unlocking.

It should be noted that, in the embodiment of the present disclosure, in order to improve the security of the mobile terminal, when recognizing that there are at least two faces in the image, the unlocking operation is not performed. That is, the above step 103 includes: judging whether there is only one face in the captured image; when there is only one face, judging whether the image matches the preset face template; and when there are two faces, maintaining the locked screen state or the screen-off state.

Figure 3:
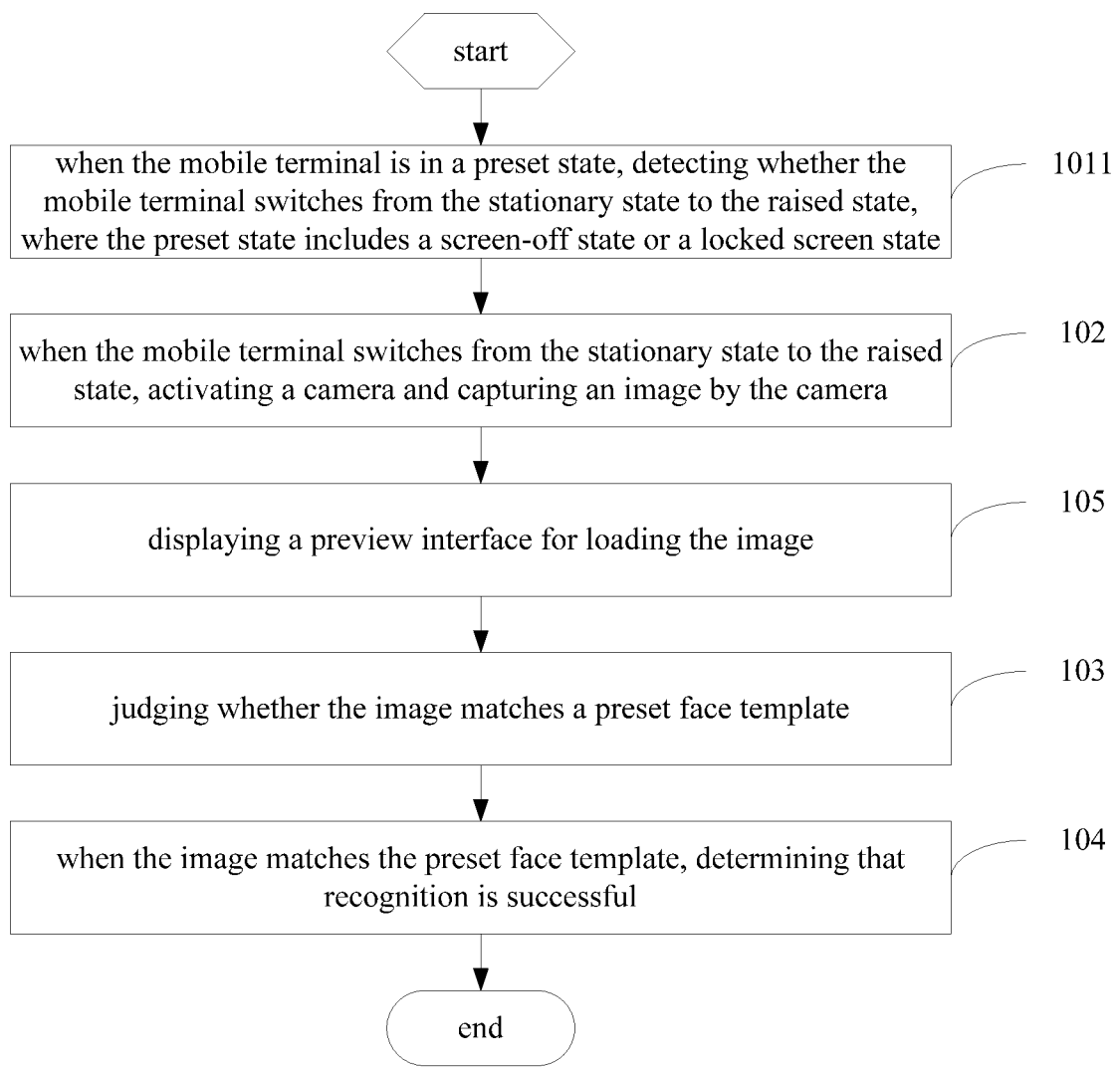
FIG. 3 is a third flowchart of a face recognition method according to an embodiment of the present disclosure.

Further, in order to improve accuracy of the face recognition, in this embodiment, a preview interface for the image captured by the camera may also be output to enable the user to better perform the face unlocking operation. Specifically, referring to FIG. 3, after the above step 102, the method further includes:

Step 105: displaying a preview interface for loading the image.

In this embodiment, the size and position of the preview interface may be displayed according to actual needs. For example, the preview interface may be displayed in full screen, half screen or small window.

Figure 4:
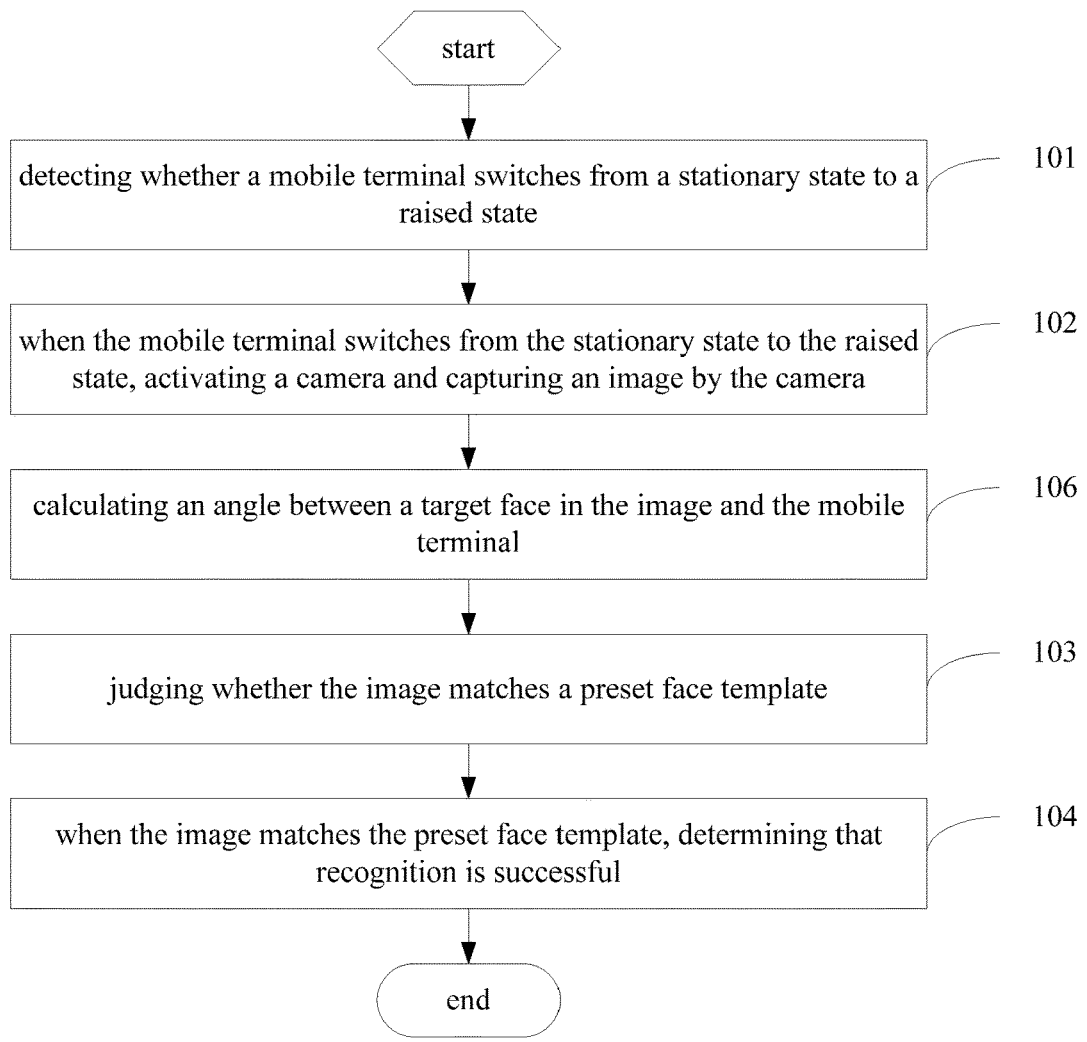
FIG. 4 is a fourth flowchart of a face recognition method according to an embodiment of the present disclosure.

Further, in order to improve accuracy of judging whether the mobile terminal is lifted up, an angle between the face and the mobile terminal may also be recognized in one embodiment. Specifically, referring to FIG. 4, before the above step 103, the method further includes:

Step 106: calculating an angle between a target face in the image and the mobile terminal.

The above step 103 includes: when the angle is within a preset range, determining whether the image matches the preset face template.

In this embodiment, the above angle may include a horizontal angle and/or a vertical angle. For example, when the target face is directly facing the camera of the mobile terminal, the horizontal angle is 0°; when the face turns to the right, the angle is increased from 0° to plus 90°; when the face turns to the left, the angle is decreased from 0° to minus 90°. When the face is gradually lowered or raised, the angle between the face and the mobile terminal in the vertical direction is changed.

Specifically, the calculation method of the angle between the target face and the mobile terminal may be set according to actual needs, for example, adopting Active Appearance Model (AAM) to estimate the face rotation angle, or linear discriminant analysis (Linear). The AAM algorithm builds a model based on training data, and then uses the model to perform matching operations on the face. It can use shape information to perform statistical analysis on important facial texture information. In addition, a face detection algorithm based on deformable parts model may be adopted. This method defines a face as a combination of different parts of the face, such as the nose, eyes, mouth, ears, these different parts are combined via "spring". This method finds these parts and their 3D geometric relationship, and comprehensively uses these models to calculate the angle between the face and the mobile terminal.

In this embodiment, when the above angle is within the preset range, the preview interface may be displayed to enable the user to better perform the face unlocking operation. When the angle is not within the preset range, the preview interface may not be displayed, thereby preventing unnecessary display due to the user's misoperation, which affects the user experience.

In the embodiment, the angle between the target face and the mobile terminal is analyzed, and this can improve the accuracy of determining that the user needs to perform face unlocking.

Further, the manner for detecting whether the mobile terminal switches from the stationary state to the raised state may be set according to actual needs. Specifically, in this embodiment, the above step 101 includes:

Step 1012: obtaining acceleration values of the mobile terminal in three-dimensional space detected by a three-axis acceleration sensor at a preset interval.

Step 1013: determining spatial angle information of the mobile terminal according to the acceleration values.

Step 1014: according to change amount of the spatial angle information in a preset time period, judging whether the mobile terminal switches from the stationary state to the raised state in the preset time period.

In this embodiment, the preset time period may be set according to actual needs. Generally, the three-axis acceleration sensor outputs every 0.1 seconds currently detected acceleration values, including acceleration values in the X-axis, the Y-axis and the Z-axis direction. Thus, the preset time period may be 0.1 seconds. Of course, the preset time period may be set to other values according to the sensitivity, which is not further limited herein.

According to the acceleration value obtained in each time, the current spatial angle information of the mobile terminal can be calculated. By continuously monitoring the spatial angle information, the state of the mobile terminal can be determined. For example, during one period time, the change amount of the spatial angle information is greater than a preset value, it is determined that the mobile terminal is in a raised state. During one period time, the change amount of the spatial angle information is less than or equal to the preset value, it is determined that the mobile terminal is in a stationary state. Thus, actions of the user, i.e., lifting his wrist to lift up the mobile terminal, can be better recognized, thereby improving the accuracy of determining that the user needs to perform face unlocking.

Figure 5:
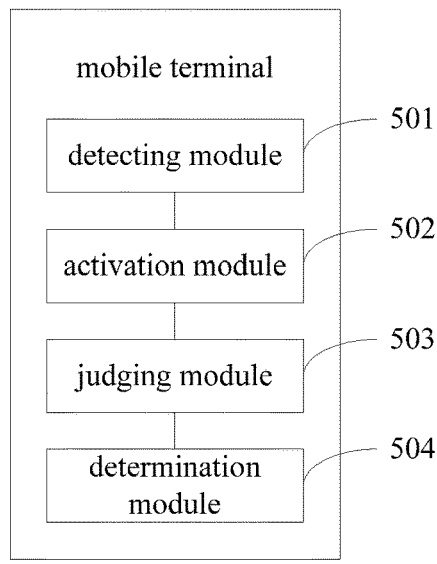
FIG. 5 is a block diagram of a mobile terminal according to an embodiment of the present disclosure.

Referring to FIG. 5, FIG. 5 is a block diagram of a mobile terminal according to an embodiment of the present disclosure, which can implement the details of the face recognition method in the above embodiment, and achieve the same effect. As shown in FIG. 5, the mobile terminal includes:

a detecting module 501 used to detect whether the mobile terminal switches from a stationary state to a raised state;

an activation module 502 used to, when the mobile terminal switches from the stationary state to the raised state, activate a camera to capture an image by the camera;

a judging module 503 used to judge whether the image matches a preset face template.

a determination module 504 used to determine that recognition is successful when the image matches the preset face template.

Optionally, the detecting module 501 is specifically used to, when the mobile terminal is in a preset state, detect whether the mobile terminal switches from the stationary state to the raised state, where the preset state includes a screen-off state or a locked screen state.

Optionally, capturing the image by the camera includes: capturing an image in the preset state by the camera.

Optionally, the mobile terminal further includes:

a calculation module used to calculate an angle between a target face in the image and the mobile terminal;

when the angle is within a preset range, trigger the judging module to perform the step of judging whether the image matches a preset face template.

Optionally, the detecting module 501 includes:

an obtaining unit used to obtain at a preset interval, acceleration values of the mobile terminal in three-dimensional space detected by a three-axis acceleration sensor;

an angle determining unit used to determine spatial angle information of the mobile terminal according to the acceleration values;

a judging unit used to, according to change amount of the spatial angle information in a preset time period, judge whether the mobile terminal switches from the stationary state to the raised state in the preset time period.

In this way, when the mobile terminal of the embodiment of the present disclosure switches from the stationary state to the raised state, the mobile terminal activates the camera to capture an image and then performs face recognition, thereby shortening operation time of the face recognition, improving the convenience of the face recognition, and improving intelligence of the mobile terminal.

Figure 6:
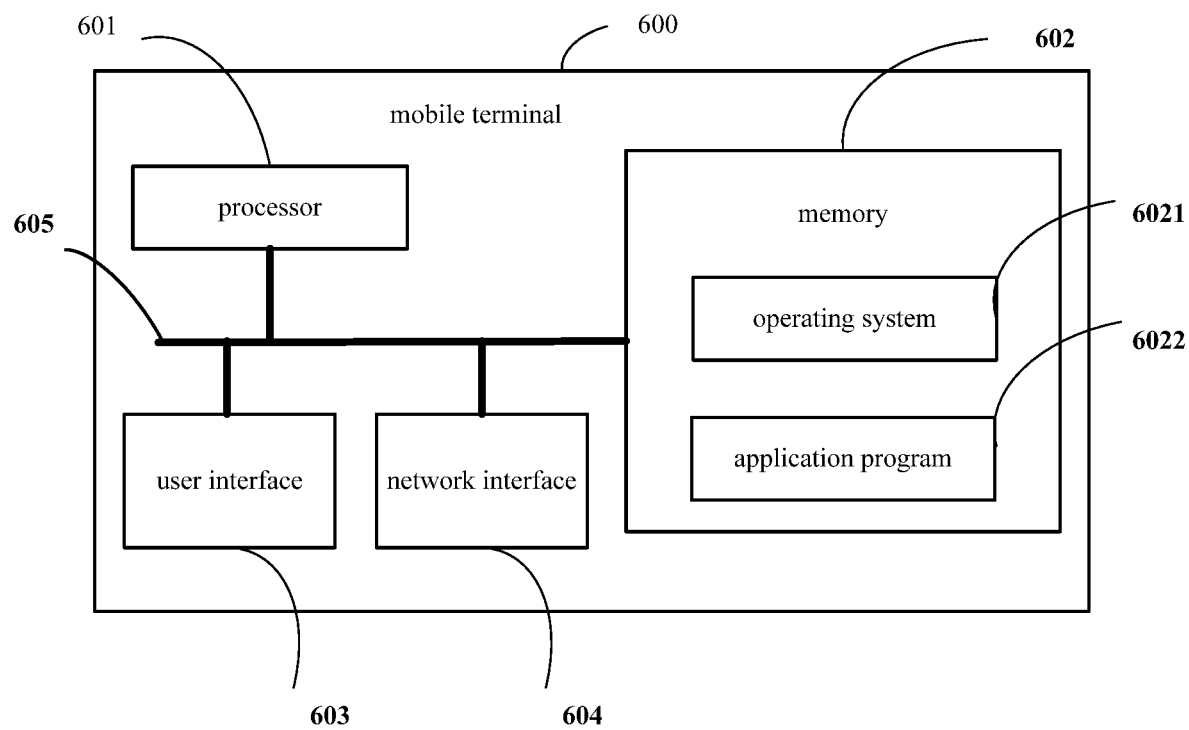
FIG. 6 is a block diagram of a mobile terminal according to another embodiment of the present disclosure.

Referring to FIG. 6, FIG. 6 is a block diagram of a mobile terminal according to an embodiment of the present disclosure, which can implement the details of the face recognition method in the above embodiment, and achieve the same effect. As shown in FIG. 6, the mobile terminal 600 includes at least one processor 601, a memory 602, at least one network interface 604, and a user interface 603. The various components in the mobile terminal 600 are coupled together by a bus system 605. It will be appreciated that the bus system 605 is configured to implement the connection and communication among the components. The bus system 605 includes a power bus, control bus, state signal bus besides a data bus. For the clarity of description, each bus in the FIG. 6 is denoted as the bus system 605.

The user interface 603 may include a monitor, keyboard, or a clickable device (for example, a mouse, track ball, touchpad, or touch screen).

It can be understood that the memory 602 in embodiments of the present disclosure may be a volatile storage or a nonvolatile storage, or both the volatile storage and nonvolatile storage. The nonvolatile storage may be Read Only Memory (ROM), Programmable Read-Only Memory (PROM), Erasable Programmable Read-Only Memory (EPROM), Electrically Erasable Programmable Read-Only Memory (EEPROM) or flash. The volatile storage may be a Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRSDRAM), Enhanced SDRAM (ESDRAM), Synchronization Link DRAM (SLDRAM) and Direct Rambus RAM (DR-RAM). The memory 602 in the system and method described in embodiments of the present disclosure include, but is not limited to, these and any other suitable types of storages.

In some embodiments, the memory 602 stores following elements, such as executable modules, data structure, subset thereof, or superset thereof: operating system 6021 and an application program 6022.

The operating system 6021 includes various kinds of system programs, such as a framework layer, a core library layer and a driver layer, which are used to implement various kinds of basic services and process hardware-based tasks. The application program 6022 includes various kinds of application programs, such as Media Player and Browser, which are used to implement various kinds of application services. Programs, which are used to implement the methods in embodiments of the present disclosure, may be included in the application program 6022.

In one embodiment of the present disclosure, the mobile terminal 600 further includes: a computer program which is stored on the memory 602 and executable on the processor 601. Specifically, the computer program may be a computer program in the application 6022. The computer program is executed by the processor 601 to implement the following steps: detecting whether a mobile terminal switches from a stationary state to a raised state; when the mobile terminal switches from the stationary state to the raised state, activating a camera and capturing an image by the camera; judging whether the image matches a preset face template; and, when the image matches the preset face template, determining that recognition is successful.

The methods in the above embodiments of the present disclosure may be applied to or implemented by the processor 601. The processor 601 may be an integrated circuit chip with signal processing capability. In the implementation process, each step of the above method can be completed by the integrated logic circuit of the hardware in processor 601 or the instructions in the form of software. The processor 601 mentioned above may be a general purpose processor, Digital Signal Processor (DSP), Application Specific Integrated Circuit (ASIC), Field Programmable Gate Array (FPGA) or other programmable logic device, discrete Gate or transistor logic device, discrete hardware component. Methods, steps and logical block diagrams disclosed in embodiments of the present disclosure may be realized or implemented. A general-purpose processor can be a microprocessor or the general-purpose processor can be any regular processor, etc. The steps in combination with the method disclosed in embodiments of the present disclosure may be directly embodied as the execution of the hardware decoding processor or by a combination of hardware and software modules in the decoding processor. Software modules can be located in random access memory, flash memory, read only memory, programmable read only memory or electrically-erasable programmable memory, register and other mature computer readable storage media in this field. The storage medium is located in the memory 602, and the processor 601 reads the information in the memory 602 to implement steps in the above method in combination with the hardware.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

Optionally, the computer program is executed by the processor 601 to further implement the following steps: when the mobile terminal is in a preset state, detecting whether the mobile terminal switches from the stationary state to the raised state, where the preset state includes a screen-off state or a locked screen state.

Optionally, capturing the image by the camera includes: capturing an image in the preset state by the camera.

Optionally, the computer program is executed by the processor 601 to further implement the following steps: calculating an angle between a target face in the image and the mobile terminal; when the angle is within a preset range, judging whether the image matches a preset face template.

Optionally, the computer program is executed by the processor 601 to further implement the following steps: obtaining acceleration values of the mobile terminal in three-dimensional space detected by a three-axis acceleration sensor at a preset interval; determining spatial angle information of the mobile terminal according to the acceleration values; according to change amount of the spatial angle information in a preset time period, judging whether the mobile terminal switches from the stationary state to the raised state in the preset time period.

In this way, when the mobile terminal of the embodiment of the present disclosure switches from the stationary state to the raised state, the mobile terminal activates the camera to capture an image and then performs face recognition, thereby shortening operation time of the face recognition, improving the convenience of the face recognition, and improving intelligence of the mobile terminal.

Figure 7:
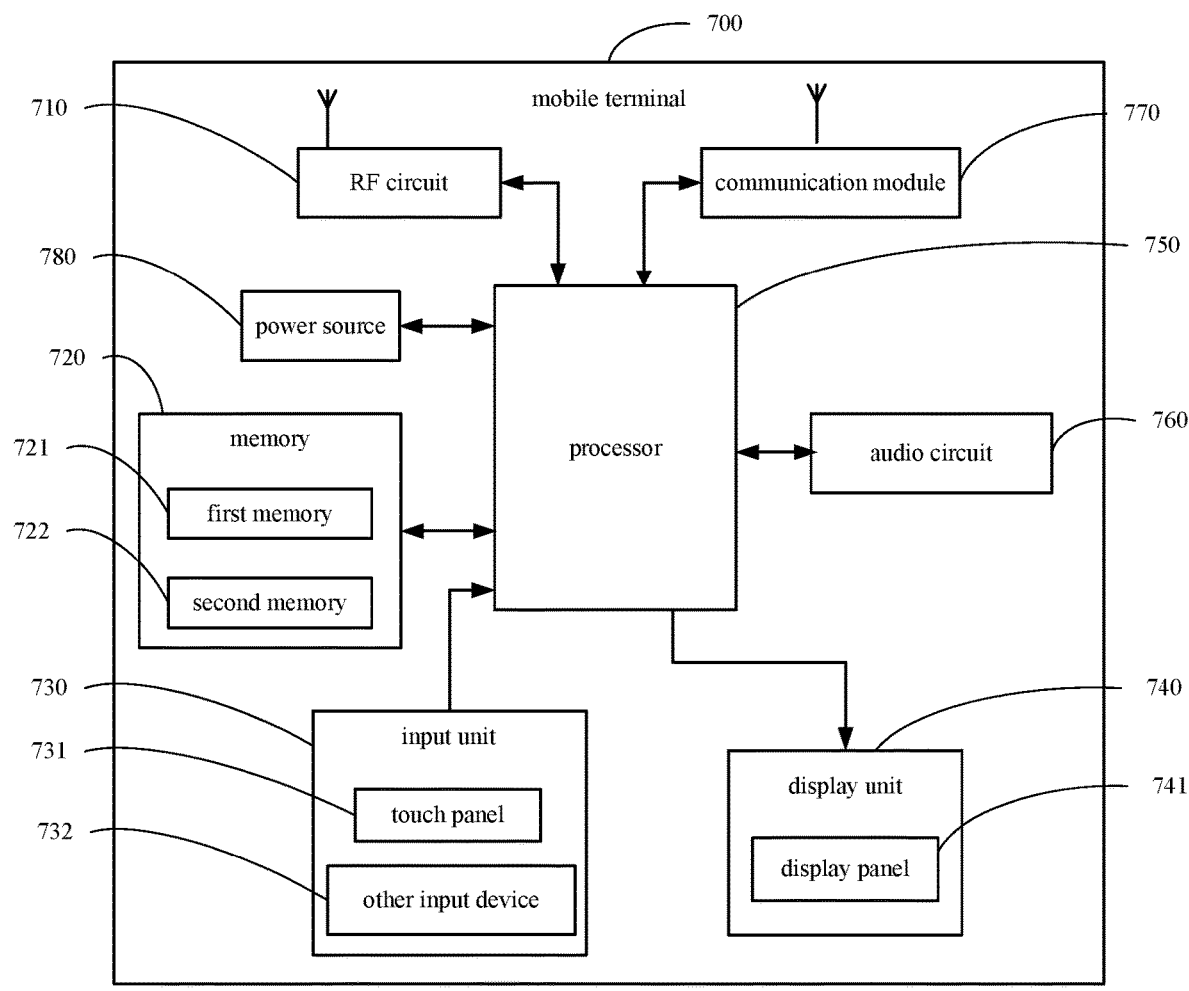
FIG. 7 is a block diagram of a mobile terminal according to still another embodiment of the present disclosure.

Referring to FIG. 7, FIG. 7 is a block diagram of a mobile terminal according to an embodiment of the present disclosure, which can implement the details of the face recognition method in the above embodiment and achieve the same effect. As shown in FIG. 7, the mobile terminal 700 includes a radio frequency (RF) circuit 710, a memory 720, an input unit 730, a display unit 740, a processor 750, an audio circuit 760, a communication module 770, a power source 780 and a camera (not shown).

The input unit 730 may be used to receive numeric or character information inputted by a user, and generate an input of signal, which is relevant with user settings and function control of the mobile terminal 700. Specifically, in the embodiment of the present disclosure, the input unit 730 may include a touch panel 731. The touch panel 731, also referred to as touch screen, may collect touch operations of the user on or around the touch screen (e.g., a user's operations on the touch panel 731 by using a finger, a touch pen, or any appropriate object or attachment), and drive a corresponding connection device, based on a preset program. Optionally, the touch panel 731 may include two parts, e.g., a touch detecting device, and a touch controller. The touch detecting device is used to detect a touch direction of a user, detect a signal from a touch operation, and transmit the signal to the touch controller. The touch controller is used to receive touch information from the touch detecting device, convert the touch information to contact coordinates, transmit the contact coordinates to the processor 750, receive and execute a command from the processor 750. In addition, the touch panel 731 may be implemented by various types, such as, resistive, capacitive, infrared, and surface acoustic waves. In addition to the touch panel 731, the input unit 730 may also include other input device 732, which may include, but is not limited to, one or more of a physical keyboard, function keys (such as volume control buttons, switch buttons, etc.), trackball, mouse, joystick, and the like.

The display unit 740 may be configured to display information inputted by the user, or information provided for the user, and various menu interfaces of the mobile terminal 700. The display unit 740 may include a display panel 741.

Optionally, the display panel 741 may be configured by using LCD, or Organic Light-Emitting Diode (OLED).

It should be noted that, the touch panel 731 may cover the display panel 741 to form a touch display. When the touch display detects a touch operation on, or around it, the touch display transmits to the processor 750, so as to determine the type of the touch event. Subsequently, the processor 750 provides a corresponding visual output on the touch display based on the type of the touch event.

The processor 750 is a control center of the mobile terminal 700. The processor 750 connects each part of the whole mobile phone, by using various interfaces and lines. The processor 750 performs various functions of the mobile terminal 700, and processes data, by running or executing software programs, and/or, modules in the first memory 721, and calls data in the second memory 722, so as to perform an overall monitor on the mobile terminal 700. Optionally, the processor 750 may include one or more processing units.

In one embodiment of the present disclosure, by calling a software program and/or module stored in the first memory 721 and/or data in the second memory 722, the processor 750 executes the computer program to perform the following steps: detecting whether a mobile terminal switches from a stationary state to a raised state; when the mobile terminal switches from the stationary state to the raised state, activating a camera and capturing an image by the camera; judging whether the image matches a preset face template; and, when the image matches the preset face template, determining that recognition is successful.

Optionally, the processor 750 executes the computer program to perform the following steps: when the mobile terminal is in a preset state, detecting whether the mobile terminal switches from the stationary state to the raised state, where the preset state includes a screen-off state or a locked screen state.

Optionally, capturing the image by the camera includes: capturing an image in the preset state by the camera.

Optionally, the processor 750 executes the computer program to perform the following steps: calculating an angle between a target face in the image and the mobile terminal; when the angle is within a preset range, judging whether the image matches a preset face template.

Optionally, the processor 750 executes the computer program to perform the following steps: reading at a preset interval, acceleration values of the mobile terminal in three-dimensional space detected by a three-axis acceleration sensor; determining spatial angle information of the mobile terminal according to the acceleration values; according to change amount of the spatial angle information in a preset time period, judging whether the mobile terminal switches from the stationary state to the raised state in the preset time period.

In this way, when the mobile terminal of the embodiment of the present disclosure switches from the stationary state to the raised state, the mobile terminal activates the camera to capture an image and then performs face recognition, thereby shortening operation time of the face recognition, improving the convenience of the face recognition, and improving intelligence of the mobile terminal.

One embodiment of the present disclosure further provides a computer readable storage medium including a computer program stored thereon. The computer program is executed by a processor to implement the steps of the face recognition method in any one of the above method embodiments.

The person skilled in this field may be aware that the units and algorithmic steps of each embodiment described in the embodiments of the present disclosure can be realized by electronic hardware or a combination of the electronic hardware and computer software. Whether these functions are performed with hardware or software depends on the specific application and design constraints of the technical solution. Professionals may use different methods for each particular application to implement the described function, but such implementations should not be considered as beyond the scope of this disclosure.

The technical personnel in the field can clearly understand that, for the convenience and simplicity of description, the specific working process of the system, device and unit described above can refer to the corresponding process in the above method embodiment, and it will not be repeated here.

In the embodiments provided in the present application, it should be understood that the disclosed device and method may be realized by other modes. For example, the device embodiment described above is only illustrative, for example, the units are divided according to the logical function and can be divided in other modes in fact. For instance, multiple units or components can be combined with or can be integrated into another system, or some characteristics can be ignored, or are not executed. On the other hand, the coupling or direct coupling or communication connection shown or discussed among each other may be indirect coupling or communication connection through some interfaces, devices or units, which may be electrical, mechanical or in other forms.

The units described above as separation units may or may not be physically separated, and the components displayed as the units may or may not be the physical units. The units can be located in one place or distributed to multiple network units. Partial or all of these units may be selected according to actual requirements to realize the purpose of the solutions in embodiments of the present disclosure.

Further, each function unit in each embodiment of the present disclosure may be integrated into one processing unit, each unit may be set in a separate physical location, or two or more than two units may be integrated into one unit.

When the functions are implemented in the form of a software function unit and sold or used as a separate product, the software function unit may be stored in a computer readable storage medium. On the basis of such an understanding, the technical scheme of the preset disclosure in essence or those contributing to the existing technology in embodiments of the present disclosure can be embodied in the form of software products. The computer software product may be stored in a storage medium, which may include several instructions to enable a computer device (which can be a personal computer, server, or network device, etc.) to perform all or partial of the method in each embodiment of the present disclosure. The storage medium may be various kinds of medium that may store the program codes, such as the U disk, a mobile hard disk, Read-Only Memory (ROM), Random Access Memory (RAM), a diskette or a CD-ROM, etc.

The above are only the specific embodiments of the present disclosure, but the protection scope of the present disclosure is not limited to these embodiments. Any technical personnel who is familiar with the technical field can easily think of changes or substitutions within the technical scope of the present disclosure and these changes and substitutions should be included in the protection scope of the present disclosure. Therefore, the protection scope of the present disclosure shall be subject to the protection scope of the claims.

What is claimed is:

1. A face recognition method applied to a mobile terminal, comprising:
   detecting whether a mobile terminal switches from a stationary state to a raised state by:
      obtaining acceleration values of the mobile terminal in three-dimensional space at a preset interval;
      determining spatial angle information of the mobile terminal according to the acceleration values; and
      according to change amount of the spatial angle information in a preset time period, judging whether the mobile terminal switches from the stationary state to the raised state in the preset time period;
   activating a camera and capturing an image by the camera, when the mobile terminal switches from the stationary state to the raised state;
   judging whether the image matches a preset face template; and
   determining that recognition is successful when the image matches the preset face template.

2. The method according to claim 1, wherein the detecting whether a mobile terminal switches from a stationary state to a raised state, comprises: when the mobile terminal is in a preset state, detecting whether the mobile terminal switches from the stationary state to the raised state, wherein the preset state comprises a screen-off state or a locked screen state.

3. The method according to claim 2, wherein the capturing an image by the camera, comprises: capturing an image in the preset state by the camera.

4. The method according to claim 1, wherein before the step of judging whether the image matches a preset face template, the method further comprises: calculating an angle between a target face in the image and the mobile terminal; when the angle is within a preset range, judging whether the image matches the preset face template.

5. A mobile terminal comprising:
   one or more processors;
   a memory; and
   one or more programs, wherein the one or more programs are stored in the memory and are configured to be executed by the one or more processors, and wherein the one or more programs are executed to implement steps of the face recognition method according to claim 1.

6. A computer readable storage medium comprising a computer program stored thereon, wherein the computer program is executed by a processor to implement the steps of the face recognition method according to claim 1.

7. A mobile terminal comprising:
   a detecting module used to detect whether the mobile terminal switches from a stationary state to a raised state, wherein the detecting module comprises:
      an obtaining unit used to obtain acceleration values of the mobile terminal in three-dimensional space detected by a three-axis acceleration sensor at a preset interval;
      an angle determining unit used to determine spatial angle information of the mobile terminal according to the acceleration values; and
      a judging unit used to, according to change amount of the spatial angle information in a preset time period, judge whether the mobile terminal switches from the stationary state to the raised state in the preset time period;
   an activation module used to, when the mobile terminal switches from the stationary state to the raised state, activate a camera to capture an image by the camera;
   a judging module used to judge whether the image matches a preset face template;
   a determination module used to determine that recognition is successful when the image matches the preset face template.

8. The mobile terminal according to claim 7, wherein the detecting module is specifically used to, when the mobile terminal is in a preset state, detect whether the mobile terminal switches from the stationary state to the raised state, wherein the preset state includes a screen-off state or a locked screen state.

9. The mobile terminal according to claim 8, wherein capturing the image by the camera comprises: capturing an image in the preset state by the camera.

10. The mobile terminal according to claim 7, wherein the mobile terminal further comprises: a calculation module used to calculate an angle between a target face in the image and the mobile terminal; when the angle is within a preset range, trigger the judging module to perform the step of judging whether the image matches the preset face template.

* * * * *